(12) United States Patent
Ketharaju et al.

(10) Patent No.: US 12,483,557 B1
(45) Date of Patent: Nov. 25, 2025

(54) SYSTEMS AND METHODS FOR DATA LINEAGE AUTHENTICATION

(71) Applicant: Wells Fargo Bank, N.A., San Francisco, CA (US)

(72) Inventors: Rameshchandra Bhaskar Ketharaju, Hyderabad (IN); Himanshu Baral, Fremont, CA (US); Shuvam Sengupta, Kolkata (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 245 days.

(21) Appl. No.: 18/154,156

(22) Filed: Jan. 13, 2023

(51) Int. Cl.
*H04L 9/40* (2022.01)
*H04L 9/00* (2022.01)

(52) U.S. Cl.
CPC ............... *H04L 63/10* (2013.01); *H04L 9/50* (2022.05)

(58) Field of Classification Search
CPC .................................... H04L 63/10; H04L 9/50
See application file for complete search history.

(56) References Cited

U.S. PATENT DOCUMENTS

| | | | | |
|---|---|---|---|---|
| 10,176,308 | B2 * | 1/2019 | Mintz | H04L 9/3297 |
| 10,951,420 | B2 | 3/2021 | Borne-Pons et al. | |
| 11,075,757 | B2 | 7/2021 | Schiatti et al. | |
| 11,301,460 | B2 | 4/2022 | Rich et al. | |
| 2018/0025435 | A1 * | 1/2018 | Karame | H04L 9/3236 705/30 |
| 2018/0288022 | A1 | 10/2018 | Madisetti et al. | |
| 2019/0109707 | A1 * | 4/2019 | Ajoy | H04L 9/0643 |
| 2019/0236598 | A1 * | 8/2019 | Padmanabhan | G06Q 20/389 |
| 2019/0238316 | A1 * | 8/2019 | Padmanabhan | H04L 67/1095 |
| 2020/0007513 | A1 * | 1/2020 | Gleichauf | G06F 21/105 |
| 2020/0019545 | A1 * | 1/2020 | Ye | G06F 16/2255 |
| 2020/0134066 | A1 * | 4/2020 | Yegorin | H04L 9/0637 |
| 2020/0410101 | A1 | 12/2020 | Misra | |
| 2021/0182423 | A1 * | 6/2021 | Padmanabhan | H04L 9/3271 |
| 2021/0185091 | A1 * | 6/2021 | Cage | G06Q 20/3821 |
| 2021/0256070 | A1 | 8/2021 | Tran et al. | |
| 2021/0281410 | A1 | 9/2021 | Hain | |

(Continued)

OTHER PUBLICATIONS

Ghosh, Bishakh Chandra, et al. "Leveraging public-private blockchain interoperability for closed consortium interfacing." IEEE INFOCOM 2021-IEEE Conference on Computer Communications. IEEE, 2021. (10 Pages).

*Primary Examiner* — Catherine Thiaw
*Assistant Examiner* — Nega Woldemariam
(74) *Attorney, Agent, or Firm* — K&L Gates LLP

(57) ABSTRACT

Systems, apparatuses, methods, and computer program products are disclosed for providing interoperability between private and public blockchains. An example method for providing interoperability between private and public blockchains includes, by a key exchange controller (KEC): receiving access key generation instructions; generating, based on the key generation instructions, an access key comprising access credentials; transmitting the access key to an access key target on a public blockchain network; receiving, from the access key target, a access request including the access credentials and information indicating a private blockchain on a private blockchain network; and providing, in response to receiving the access request, access for the access key target to access the private blockchain of the private blockchain network.

20 Claims, 4 Drawing Sheets

(56) References Cited

U.S. PATENT DOCUMENTS

| | | | |
|---|---|---|---|
| 2022/0076246 A1* | 3/2022 | Griffin | G06Q 20/3678 |
| 2022/0270725 A1* | 8/2022 | DeRosa-Grund | G06F 16/2365 |
| 2022/0303258 A1* | 9/2022 | Mee | H04L 63/083 |
| 2023/0034621 A1 | 2/2023 | Pardo | |
| 2023/0162180 A1 | 5/2023 | Deng | |
| 2024/0070306 A1 | 2/2024 | Jurat | |
| 2024/0146552 A1* | 5/2024 | Marsh | G06Q 50/01 |
| 2024/0370861 A1* | 11/2024 | Benvenuti | H04L 9/3278 |

* cited by examiner

SYSTEMS AND METHODS FOR DATA LINEAGE AUTHENTICATION

BACKGROUND

Blockchain technology, the use of a distributed ledger that can process transactions across a network without a single point of failure, has grown rapidly in recent years in terms of popularity and technological advancement. Blockchain technology has also seen an explosion in popularity particularly in the form of cryptocurrencies and non-fungible token (NFT) exchanges (e.g., transactions).

BRIEF SUMMARY

Generally, in the technical fields of analytics and data management, having a clear and defined lineage (e.g., history) of an entire life cycle of a piece of data (e.g., a file, a folder, a time series, a data set, etc.) is ideal. In particular, reliability of modeling solutions (e.g., machine learning models, deep learning models, artificial intelligence (AI) models, expert systems, etc.) are all heavily impacted by the completeness and authenticity of such pieces of data. However, in reality, such data lineage is not well-documented and is not usually kept up to date. One challenge for maintaining data lineage occurs when data is not readily accessible to one or more entities (e.g., when data is stored on a private ledger such as private blockchain). For example, a corporation (e.g., a financial institution) may contract a third-party vendor to use data stored on the corporation's private blockchain to generate forecasts for the corporation. If the corporation wishes for the third-party vendor to play an active role in keeping a data lineage of the sensitive data up to date (e.g., update a data lineage of the sensitive data on the private ledger), a mechanism would be required for said third-party vendor to access the corporation's private blockchain (e.g., through a public blockchain). The inventors have realized these issues and have now proposed new methods for enhancing interoperability between private and public blockchains.

In particular, systems, apparatuses, methods, and computer program products are disclosed herein for enabling improved interoperability between private and public blockchains. More specifically, a key exchange controller (KEC) may be provisioned to facilitate communication and access permission between private and public blockchains. For example, the KEC may generate one or more smart contracts (SCs) including key exchange protocols (KEPs) that would allow an entity (e.g., the above-discussed third-party vendor) associated with a public blockchain to access a corporation's private blockchain. As a result, the entity associated with the public blockchain could now advantageously play an active role in maintaining a data lineage of any data on the private blockchain which the entity has accessed (e.g., retrieved, viewed, used, or the like). Additionally, providing such access to a private blockchain in order to maintain a data lineage of the corporation's sensitive data not only results in a direct improvement to the above-discussed issues faced in the technical fields of analytics and data management but also results in an improvement to the field of blockchain technology by providing easier interaction (e.g., interoperability) between private and public blockchains.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1A:
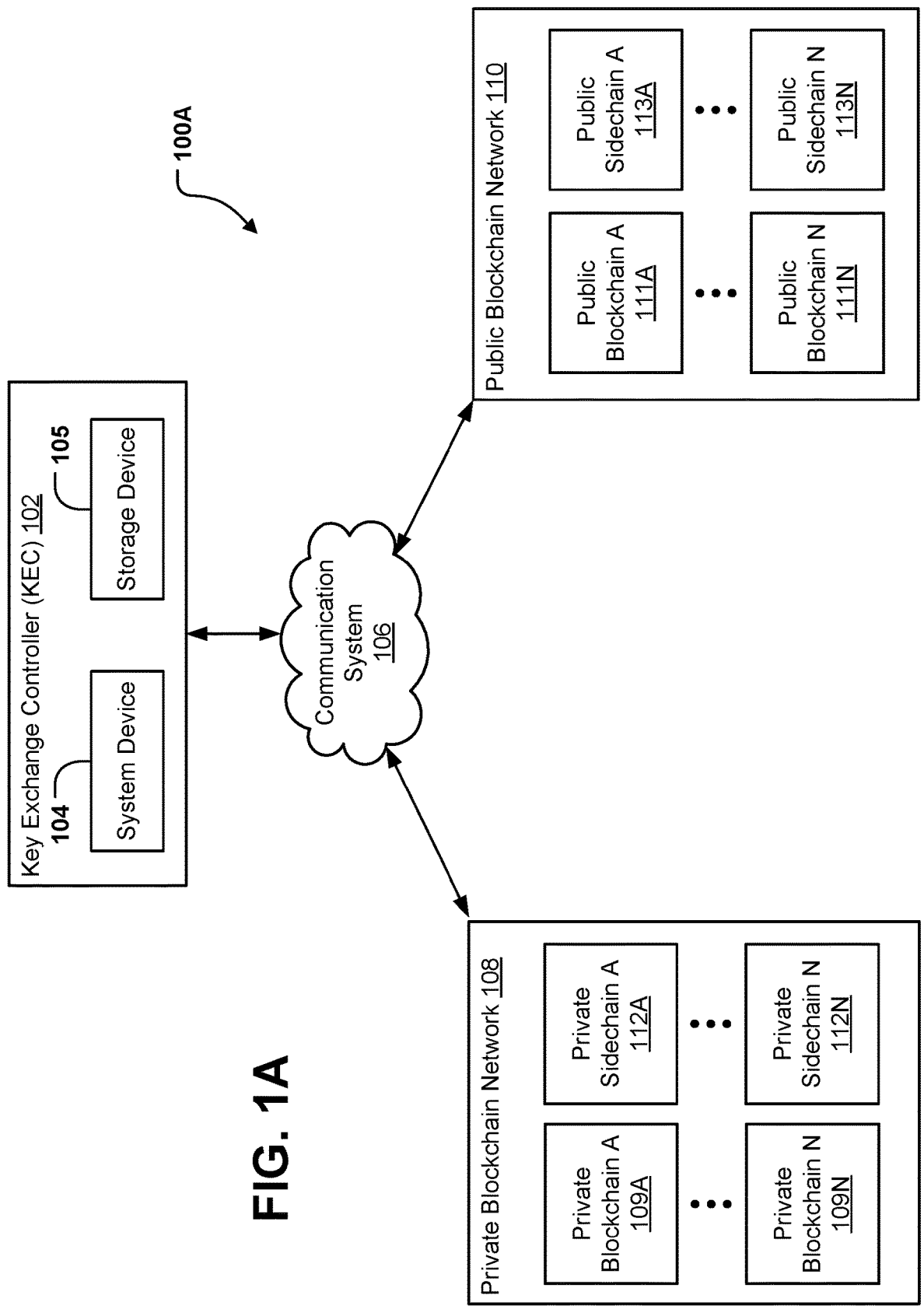
FIG. 1A illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "block" refers to a data structure associated with a blockchain. For example, a block may comprise a model definition data structure, a block header data structure, a technical data structure, a business data structure, an operational data structure, a next block information data structure, any other suitable electronic information or data structure associated therewith (including, but not limited to, links or pointers), or any combination thereof. A block header data structure may comprise a current block hash value data structure, a previous block hash value data structure, a next block hash value data structure, a Merkle root hash value data structure, a nonce value data structure, any other suitable electronic information or data structure associated therewith (including, but not limited to, links or pointers), or any combination thereof.

The term "blockchain" refers to a digital ledger comprising a growing list of blocks. For example, a blockchain may comprise a plurality of blocks, any other suitable electronic information or data structure associated therewith (including, but not limited to, links or pointers), or any combination thereof.

The term "node device" or "node" refers to a computing device, such as a server device, client device, a database server device, a data storage device, or a blockchain data storage device that stores one or more portions of a blockchain. For example, a node device may comprise a server device, a client device, a database, a database server device, any other suitable device or data structure associated therewith (including, but not limited to, links or pointers), or any combination thereof.

The term "smart contract" refers to any code usable to perform changes in a blockchain or to carry some process in the blockchain. For example, a smart contract may comprise one or more blockchain-based data structures that digitally facilitate, verify, or enforce the negotiation or performance of a contract.

The term "blockchain token" refers to a record on a blockchain that may be transferred or traded, and typically comprises unique metadata. Blockchain tokens may be associated with a particular asset, either digital or physical. Blockchain tokens may be unique, and may include assets known as non-fungible tokens (NFT). A blockchain token may comprise a metadata structure, containing information such as the date and time of the token's creation, a name and description of the blockchain token, and links or other data relating the blockchain token to an asset. Possession of the blockchain token or NFT may confer ownership rights over the asset linked to the blockchain token.

The term "sidechain" refers to a secondary blockchain that operates in parallel to a primary blockchain (e.g., a primary public blockchain on the public blockchain network or a primary private blockchain on the private blockchain network). The sidechain may set different standards for consensus, record-keeping, or other properties of the sidechain that are distinct from those of the primary blockchain. For example, a sidechain may have a lower transaction cost and faster transaction times due to a less difficult consensus requirement, or faster block times, trading off faster transactions for reduced security. Sidechains may also be permissioned, allowing an entity or consortium to manage a sidechain while still maintaining a connection to the primary blockchain. Sidechains also permit assets on the sidechain to move to and from the main chain when needed, typically by means of a two-way bridge between the two blockchains, where predetermined rules for exchange between the two blockchains are established.

Overview

Methods, apparatuses, systems, and computer program products are described herein that provide for improved interoperability between private and public blockchains. Traditionally, it is difficult for public blockchains to access data on a private blockchain, which in turn makes it difficult to document and authenticate changes made to (e.g., manage a data lineage of) a piece of data stored on the private blockchain.

In contrast to known conventional techniques in the fields of analytics and data management and blockchain technology, example embodiments described herein provide a key exchange controller (KEC) that facilities interactions (e.g., communications and access permission) between private and public blockchains.

More specifically, in some embodiments, the KEC may generate permission information (e.g., in the form of a smart contract (SC), a Key Exchange Protocol (KEP), or a combination of both) that would allow an entity on a public blockchain to access (e.g., view, mine, update a data lineage of, or the like) existing data on a private blockchain.

In some embodiments, the KEC may exist on a separate blockchain node (e.g., a node associated with a sidechain within one of the public or private blockchains for which interoperability is to be provided, a node associated with an independent third blockchain, or the like). Alternatively, in some embodiments, the KEC may be provisioned as an independent (e.g., neutral) entity that bridges a connection between the target private and public blockchains.

Such interoperability between private and public blockchains advantageously ensures that continuity of a piece of data's data lineage (e.g., for documenting alterations, transformations, change of ownership, or the like to the piece of data) can be maintained even if the data is stored on a private blockchain.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1A illustrates an example environment 100A within which various embodiments may operate. As illustrated, the environment 100A in FIG. 1A may include a key exchange controller (KEC) 102 including a system device 104 and a storage device 105, a communications network 106 (e.g., the Internet), a private blockchain network 108 hosting one or more private blockchains 109A-109N, and a public blockchain network 110 hosting one or more public blockchains 111A-111N. Although system device 104, storage device 105, private blockchain network 108, and public blockchain network 110 are described in singular form, some embodiments may utilize more than one of these components. Additionally, some embodiments of the KEC 102 may not require a storage device 105 at all (e.g., the KEC 102 may use an external storage device (not shown) connected on the communications network 106). Whatever the implementation, the KEC 102, and its constituent system device(s) 104 and/or storage device(s) 105 may receive and/or transmit information via communications network 106 with any number of other devices, such as one or more other computing devices (not shown).

System device 104 may be implemented as one or more servers, which may or may not be physically proximate to other components of the environment 100A or 100B. Furthermore, some components of system device 104 may be physically proximate to the other components of the KEC 102 while other components are not. System device 104 may receive, process, generate, and transmit data, signals, and electronic information to facilitate the operations of the KEC 102. Particular components of system device 104 are described in greater detail below with reference to apparatus 200 in connection with FIG. 2.

Storage device 105 may comprise a distinct component from system device 104, or may comprise an element of system device 104 (e.g., memory 204, as described below in connection with FIG. 2). Storage device 105 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 105 may host the software executed to operate the KEC 102. Storage device 105 may store information relied upon during operation of the KEC 102, such as various payment card information (e.g., payment card identity, payment card data, etc.), feedback information (e.g., haptic patterns, audio patterns, visual effects and/or patterns, etc.), and/or other information that may be used by the KEC manager 102, data and documents to be analyzed using the KEC 102, or the like. In addition, storage device 105 may store control signals, device characteristics, and access credentials enabling interaction between the KEC 102 and one or more of the private blockchain network 108 and/or the public blockchain network 110.

In the example of FIG. 1A, in some embodiments, the KEC 102 may be embodied by various computing devices known in the art, such as desktop or laptop computers, servers, server devices, or the like. For example, the KEC 102 may be a server provisioned with software enabling the server to provide the methods of embodiments described herein for improved interoperability between private and public blockchains. Additional components of the KEC 102 and their respective functions are described in more detail below with reference to apparatus 200 in connection with FIG. 2.

The private blockchain network 108 may include one or more private blockchains 109A-109N (e.g., as primary blockchains) and one or more private sidechains 112A-112N that are each made up of a collection of networked node devices, which may consist primarily of permissioned (private) nodes. The private blockchain network 108 may use any distributed ledger or blockchain technology that is capable of creating and exchanging blockchain tokens (e.g., NFTs). In some embodiments, the private blockchain network 108 may allow for Turing-complete scripting of contracts, known also as smart contracts, to be executed on each of the private blockchains 109A-109N and on each of the private sidechains 112A-112N. The nodes of each of the private blockchains 109A-109N and of each of the private sidechains 112A-112N may be embodied by specialized node devices, or may be embodied by any computing devices or server devices known in the art.

The public blockchain network 110 may include one or more public blockchains 111A-111N (e.g., as primary blockchains) and one or more public sidechains 113A-113N that are each made up of a collection of networked node devices, which may consist of a combination of permissionless (public) and/or permissioned (semi-private) nodes. The public blockchain network 110 may use any distributed ledger or blockchain technology that is capable of creating and exchanging blockchain tokens (e.g., NFTs). In some embodiments, the public blockchain network 110 may allow for Turing-complete scripting of contracts, known also as smart contracts, to be executed on each of the public blockchains 111A-111N and on each of the public sidechains 113A-113N. The nodes of each of the public blockchains 111A-111N and of each of the public sidechains 113A-113N may be embodied by specialized node devices, or may be embodied by any computing devices or server devices known in the art.

Figure 1B:
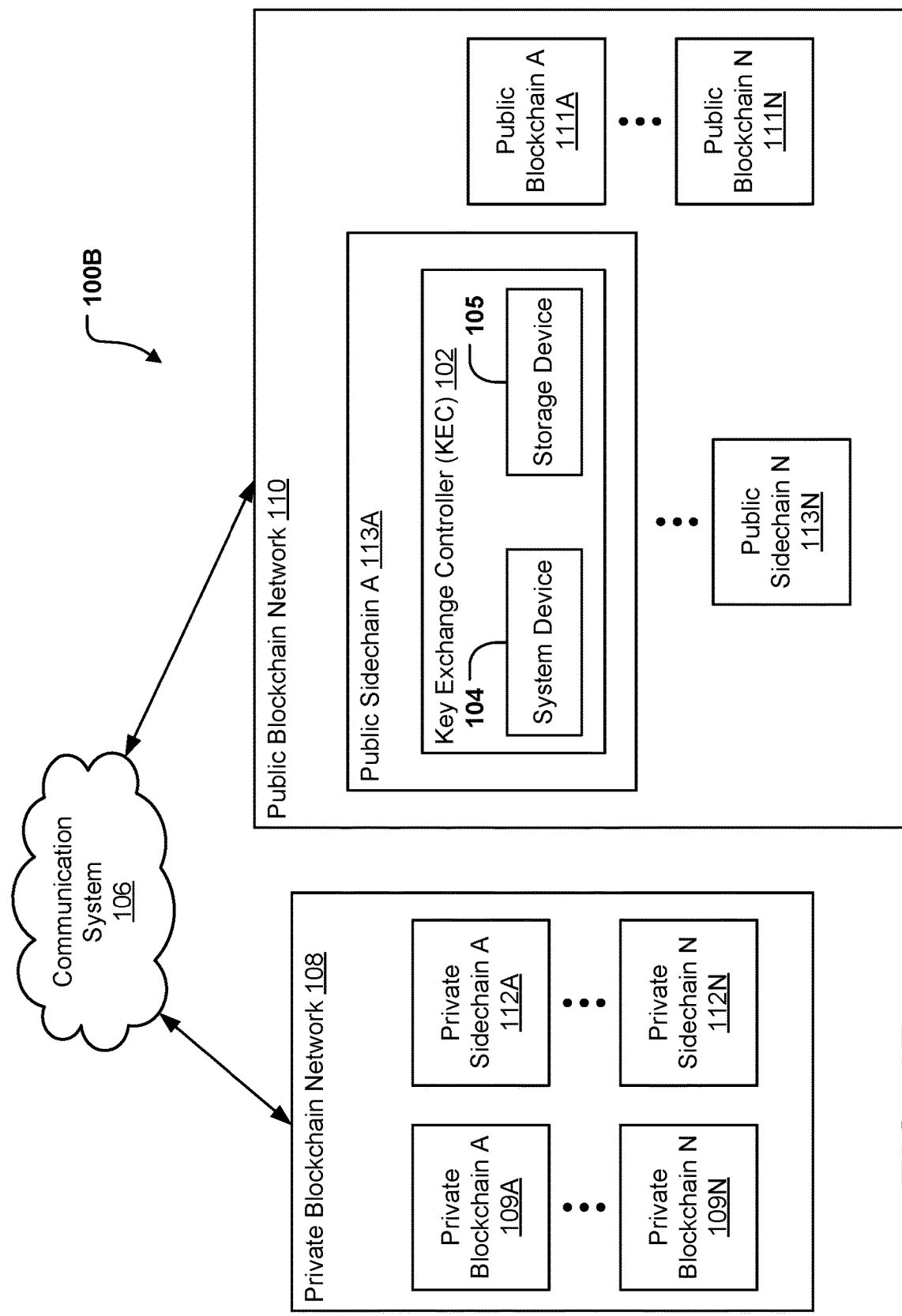
FIG. 1B illustrates another system in which some example embodiments may be used.

Turning now to FIG. 1B, FIG. 1B illustrates an example environment 100B within which various embodiments may operate. In contrast to environment 100A of FIG. 1A where the KEC 102 is shown as an independent device, environment 100B of FIG. 1B shows the KEC 102 as being part of the public blockchain network 110. In particular, in some embodiments, the KEC 102 in environment 100B of FIG. 1B may be provisioned as a node (or a combination of nodes) of one of the public blockchains 111A-111N of public blockchain network 110. In some embodiments, the node provisioned as the KEC 102 may be a node of a sidechain (e.g., public sidechain 113A as shown in FIG. 1B) on one of the public blockchains 111A-111N of the public blockchain network 110. In some embodiments, the node provisioned as the KEC 102 may also (or alternatively) be a node of a sidechain (e.g., any one of private sidechain 112A-112N) on one of the private blockchains 109A-109N of the private blockchain network 108. The node(s) making up the KEC 102 may be embodied by specialized node devices, or may be embodied by any computing devices or server devices known in the art.

Figure 2:
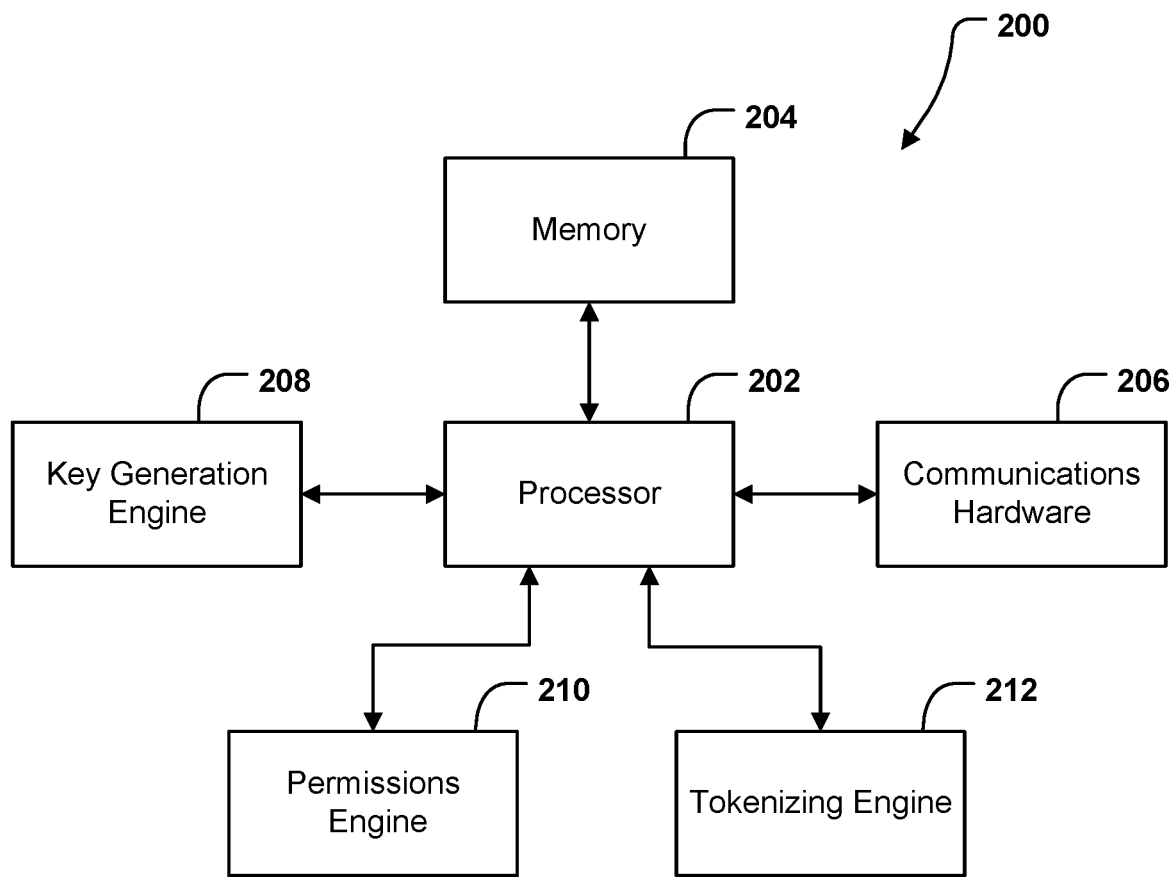
FIG. 2 illustrates a schematic block diagram of example circuitry embodying a device that may perform various operations in accordance with some example embodiments described herein.

Although FIGS. 1A and 1B illustrate an environment 100A and 100B and implementation in which the KEC 102 interacts with one or more of the private blockchain network 108 and/or the public blockchain network 110, in some embodiments users may directly interact (e.g., operate, control, modify, or otherwise interact to perform the various functions and achieve the various benefits described herein) with the KEC 102 (e.g., via input/output circuitry of system device 104, which is discussed below in reference to FIG. 2).

Example Implementing Apparatuses

System device 104 of the KEC 102 (described previously with reference to FIGS. 1A and 1B) may be embodied by one or more computing devices or servers, shown as apparatus 200 in FIG. 2. As illustrated in FIG. 2, the apparatus 200 may include processor 202, memory 204, communications hardware 206 including input-output circuitry (not shown), key generation engine 208, permissions engine 210, and tokenizing engine 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIGS. 1A and 1B and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on storage device 105, as illustrated in FIGS. 1A and 1B). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

The apparatus 200 further comprises a key generation engine 208 that generates one or more access keys (which will be described in more detail below in reference to FIG. 3). The key generation engine 208 may utilize processor 202, memory 204, or any other hardware component included in the apparatus 200 to perform these operations, as described in connection with FIG. 3 below. The key generation engine 208 may further utilize communications hardware 206 to gather data from a variety of sources (e.g., private blockchain network 108 and/or public blockchain network 110, as shown in FIGS. 1A and 1B), may utilize input-output circuitry of the communications hardware 206 to receive data from a user, and in some embodiments may utilize processor 202 and/or memory 204 to generate one or more access keys.

In addition, the apparatus further comprises a permissions engine 210 that verifies and maintains one or more incoming access requests (which will be described in more detail below in reference to FIG. 3). The permissions engine 210 may utilize processor 202, memory 204, or any other hardware component included in the apparatus 200 to perform these operations, as described in connection with FIG. 3 below. The permissions engine 210 may further utilize communications hardware 206 to gather data from a variety of sources (e.g., private blockchain network 108 and/or public blockchain network 110, as shown in FIGS. 1A and 1B), may utilize input-output circuitry of the communications hardware 206 to receive data from a user, and in some embodiments may utilize processor 202 and/or memory 204 to verify and maintain one or more incoming access requests (which will be described in more detail below in reference to FIG. 3).

Finally, the apparatus 200 further comprises a tokenizing engine 212 that manages (e.g., mines, mints, etc.) one of more non-fungible tokens (NFTs) (e.g., as blocks on any of the private blockchains 109A-109N and/or public blockchains 111A-111N as shown in FIGS. 1A and 1B). The tokenizing engine 212 may utilize processor 202, memory 204, or any other hardware component included in the apparatus 200 to perform these operations, as described in connection with FIG. 3 below. The tokenizing engine 212 may further utilize communications hardware 206 to gather data from a variety of sources (e.g., private blockchain network 108 and/or public blockchain network 110, as shown in FIGS. 1A and 1B), may utilize input-output circuitry of the communications hardware 206 to receive data from a user, and in some embodiments may utilize processor 202 and/or memory 204 to manage one or more NFTs.

Although components 202-212 are described in part using functional language, it will be understood that the particular implementations necessarily include the use of particular hardware. It should also be understood that certain of these components 202-212 may include similar or common hardware. For example, key generation engine 208, permissions engine 210, and tokenizing engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the key generation engine 208, permissions engine 210, and tokenizing engine 212 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the key generation engine 208, permissions engine 210, and tokenizing engine 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
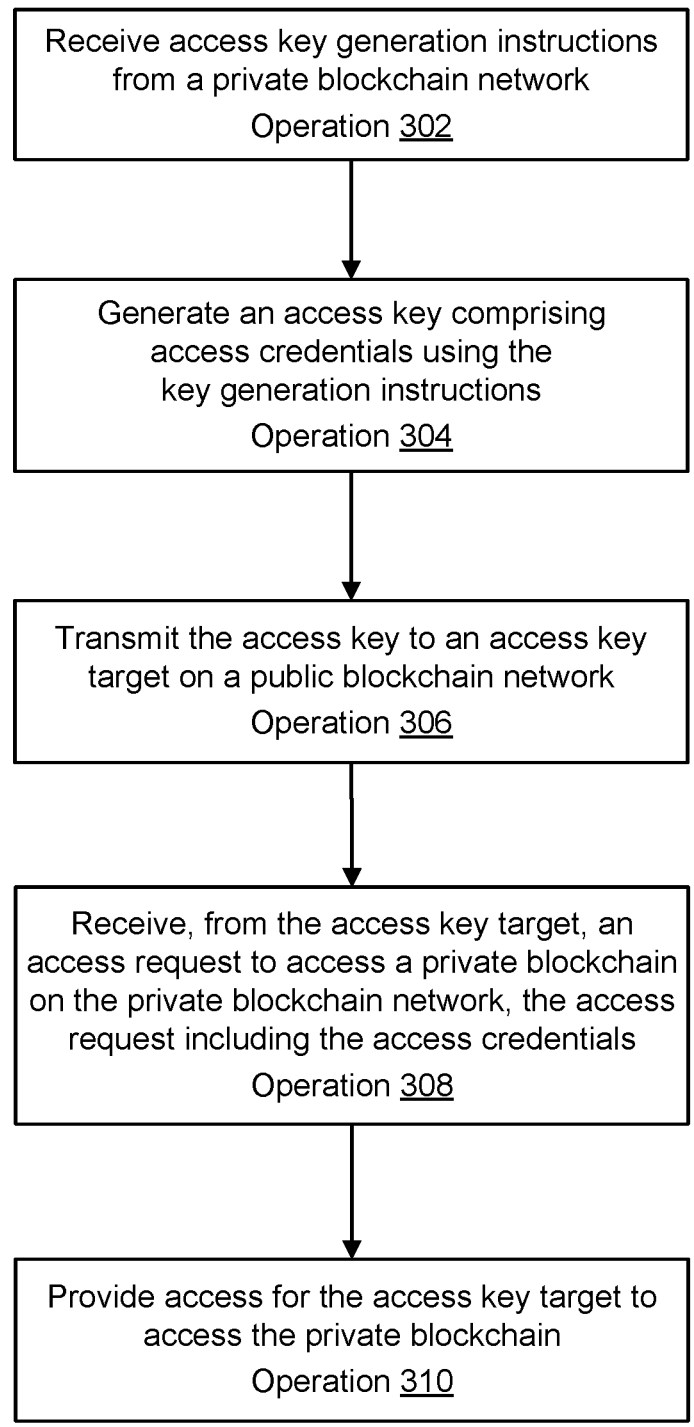
FIG. 3 illustrates an example flowchart for enabling interoperability between private and public blockchains, in accordance with some example embodiments described herein.

Turning to FIG. 3, an example flowchart is illustrated that contains example operations implemented by example embodiments described herein. The operations illustrated in FIG. 3 may, for example, be performed by system device 104 of the key exchange controller (KEC) 102 shown in FIGS. 1A and 1B, which may in turn be embodied by apparatus 200 shown and described in connection with FIG. 2. To perform the operations described below, the apparatus 200 may utilize one or more of processor 202, memory 204, communications hardware 206 including input-output circuitry, key generation engine 208, permissions engine 210, tokenizing engine 212, and/or any combination thereof. It will be understood that user interaction with the KEC 102 (e.g., apparatus 200) may occur directly via input-output circuitry of the communications hardware 206, or may instead be facilitated by a separate computing device, within environments 100A and 100B shown in FIGS. 1A and 1B, respectively, having similar or equivalent physical componentry facilitating such user interaction.

Turning now to FIG. 3, example operations are shown for providing improved interoperability between private and public blockchains.

As shown by operation 302, the apparatus 200 includes means, such as communications hardware 206, permissions engine 210, or the like, for receiving access key generation instructions from a private blockchain network (e.g., private blockchain network 108, as shown in FIGS. 1A and 1B). In some embodiments, the access key generation instructions may alternatively be received from a computing device associated with an owner and/or operator of the private blockchain network.

In some embodiments, the access key generation instructions may be received (by the communications hardware 206 of the apparatus 200) in response to the apparatus 200 receiving, at a previous point in time, an initial access request from a public blockchain (e.g., any one or any combination of the public blockchains 111A-111N, as shown in FIGS. 1A and 1B) to access a private blockchain (e.g., any one or any combination of the private blockchains 109A-109N, as shown in FIGS. 1A and 1B). In response to receiving the initial access request, the apparatus 200 may (e.g., via permissions engine 210) determine (e.g., using information included in the initial access request) the private blockchain(s) to which access is being requested. Once the private blockchain(s) is determined, the apparatus may transmit (using communications hardware 206) a request to the private blockchain notifying the private blockchain(s) is being requested by the public blockchain(s). If the private blockchain(s) determine that access should be granted, the private blockchain(s) may transmit (using one or more nodes of the private blockchain(s)) the access key generation instructions to the apparatus 200. Alternatively, if the private blockchains) determine that access should not be granted, the private blockchain(s) may transmit a notification to the apparatus 200 that the request for access is denied.

In some embodiments, determination by the private blockchain(s) to accept or deny the access request from the apparatus 200 may be based on any factor. For example, the request may be reviewed manually by an administrator of the private blockchain(s). Alternatively, the nodes of the private blockchain(s) may automatically parse the information within the request to determine whether the source of the request (e.g., the public blockchain(s)) are on a list of trusted sources. Other manual and/or automatic methods for determining whether to accept or deny the access request may be used without departing from the scope of one or more embodiments disclosed herein.

In some embodiments, the access key generation instructions may be received (by the communications hardware 206 of the apparatus 200) without receiving any initial access requests from the public blockchain(s). More specifically, the private blockchain(s) may determine (e.g., manually by an admin or automatically by the nodes) that the public blockchain(s) would require access to the private blockchain(s). For example, the public blockchain(s) may be associated with an entity (e.g., a third-party contractor, a regulatory agency, etc.) which is using (or needs to use) one or more data stored (as blocks) on the private blockchain(s). In such an example, the private blockchain(s) may proactively transmit the access key generation instructions to the apparatus 200.

In some embodiments, the access key generation instructions may include: a name and/or identifier of the public blockchain(s) that is used to determine an access key target on the public blockchain(s); a name and/or identifier of the private blockchain(s); one or more restrictions (e.g., restrictions on how long the access key will stay valid, restrictions on the number of access attempts, restrictions specifying portions of the private blockchain(s) that can be accessed, restrictions specifying functions of the private blockchain(s) that can be utilized, or the like) for any generated access keys; access credential(s) for accessing the private blockchain(s); and any relevant information on the protocols employed by the private blockchain(s) necessary for access to one or more features of the private blockchain(s).

As shown by operation 304, the apparatus 200 includes means, such as the key generation engine 208, or the like, for generating an access key comprising the access credentials using key generation instructions (e.g., the key generation instructions received in operation 302).

In some embodiments, the access key may be generated as a smart contract (SC), a key exchange protocol (KEP), or a combination of both (e.g., an SC that includes a KEP). The SC may access key may include the access credential(s) included in the access key generation instructions such that whoever (or the owner of whichever device or component that) receives the access key would have access to the private blockchain(s) that provisioned the access key generation instructions.

In some embodiments, the SC generated by the access key may include the restrictions included in the access key generation instructions. For example, the SC may be a time-based SC that is set to expire after a preset amount of time.

As shown by operation 306, the apparatus 200 includes means, such as communications hardware 206, or the like, for transmitting an access key (e.g., the access key generated in operation 304) to an access key target on a public blockchain network.

In some embodiments, as discussed above in reference to operation 302, the access key target may be indicated in the access key generation instructions. The communications hardware 206 may use the information associated with the access key target included in the access key generation instructions to transmit the access key to the access key target.

In some embodiments, the access key target may be (e.g., may be associated with) a sidechain (e.g., any of public sidechains 113B-113N as shown in FIG. 1B) of a public blockchain on the public blockchain network. The sidechain associated with the access key target may be different (e.g., separate and distinct) from the sidechain provisioned as the KEC 102 (e.g., public sidechain 113A as shown in FIG. 1B). The sidechain associated with the access key target and the sidechain provisioned as the KEC 102 may both be sidechains to a same primary public blockchain. Alternatively, the sidechain associated with the access key target and the sidechain provisioned as the KEC 102 may be associated with different primary public blockchains on the public blockchain network.

In some embodiments, the sidechain associated with the access key target may be a partial consensus and/or selective node. In some embodiments, the sidechain associated with the access key target may be terminated (e.g., decommissioned) once the SC (e.g., the SC generated as the access key) is executed or once the SC is expired.

As shown by operation 308, the apparatus 200 includes means, such as communications hardware 206, permissions engine 210, or the like, for receiving another access request (e.g., from the access target) to access the private blockchain(s).

In some embodiments, this access request from the access target may differ from the initial access request received in operation 302. For example, the access request received in operation 308 may include the access credential(s) included in the access key transmitted to the access key target in operation 306.

In some embodiments, the access request received in operation 306 may further include a plurality of SCs. Each of the SCs may include the access credentials. Alternatively, all of the SCs may be bundled as a single data packet that is linked to the access credentials. Each of the SCs may include different computer programs and/or transactions protocols that is intended to be automatically executed once received by the apparatus 200 and/or by the private blockchain(s) to which the SCs will be forwarded to by the apparatus 200 (which will be discussed in more detail in reference to operation 310).

As shown by operation 310, the apparatus 200 includes means, such as the permissions engine 210, the tokenizing engine 212, or the like, for providing the access key target access to the private blockchain(s). In some embodiments, providing the access key target access to the private blockchain(s) may include, but is not limited to: providing the access key target with permission to access and mine blocks on the private blockchain(s); accepting, by the private blockchain(s), SCs transmitted from the access key target to the private blockchain(s); or the like.

In particular, as one example, in some embodiments, in an instance where the apparatus 200 (e.g., KEC 102) is provisioned as a node of a sidechain on the public blockchain network (e.g., as shown in environment 100B of FIG. 1B), the access key target may contact the private blockchain(s) via the sidechain on which the KEC is a node. As another example, in some embodiments, in an instance where the apparatus 200 (e.g., KEC 102) is its own separate device (e.g., as shown in environment 100A of FIG. 1A), the access key target may contact the private blockchain(s) via the KEC while using the KEC as a separate gateway device. As yet another example, in some embodiments, the access key target may not need the KEC 102 at all to contact the private blockchain(s). Said another way, the access key target may directly transmit the access request including the SCs and the access credentials directly to the private blockchain(s).

In some embodiments, in the instance where the access key target directly communicates with the private blockchain(s) without going through apparatus 200 (e.g., the KEC 102), the private blockchain(s) consolidates the SCs (e.g., the SCs included in the access request transmitted by the access key target) and provides the access key target (on the public blockchain) permission to mine one or more blocks (e.g., NFTs) on the private blockchain(s). Since each of the SCs in the access request includes (or is linked to/associated with) the access credential(s), the private blockchain(s) is able to determine that each to the SCs is safe to execute.

In some one embodiments, the private blockchain(s) may also allow the access key target to create a new block on the private blockchain. Instructions for creating the new block may be included in a SC included in the access request (e.g., the access request transmitted by the access key target to the apparatus 200 and/or the access request transmitted directly from the access key target to the private blockchain(s)). In the instance where the access request is transmitted to the apparatus 200, the apparatus 200 will determine (e.g., using permissions engine 210) whether the access request includes the access credential(s). Based on the determination by the permissions engine 210, the apparatus 200 may either transmit the SCs included in the access request to the private blockchain(s) (e.g., in an instance where the access request includes the access credential(s)) or delete all data associated with the access request without transmitting the access request (or any of the included SCs) to the private blockchain(s) (e.g., in an instance where the access request include any (valid) access credential(s)).

In some embodiments, in the instance where the access request is directly transmitted by the access key target (e.g., from the public blockchain(s)) to the private blockchain(s), the new block may be generated (e.g., tokenized) by the private blockchain(s) (e.g., by one or more nodes of the private blockchain(s)). In some embodiments, in the instance where the access request is first received by the apparatus 200 (e.g., the KEC 102), the apparatus 200 may execute one or more of the SCs included in the access request to generate (e.g., tokenize using tokenizing engine 212) the new block, and then cause the private blockchain(s) to create the new block (e.g., by transmitting the new block (as part of a newly generated SC) to the private blockchain(s) for the private blockchain(s) to add the new block to its existing chain of blocks).

In some embodiments, the new block may be generated (e.g., tokenized) on the private blockchain(s) as a new sidechain (e.g., any of private sidechains 112A-112N as shown in FIG. 1B) to the private blockchain(s). The new sidechain chain may be linked to the private blockchain(s). In particular, the blockchain to which the new sidechain is linked may be associated with a piece of data (e.g., a piece of data that is (or will be used) by the access key target). The private blockchain(s) may include a plurality of blocks including a plurality of existing blocks and the newly created block of the new sidechain. Each of these blocks making up the private blockchain (including the newly created block of the new sidechain) may be configured to store data lineage information specifying a data lineage of the piece of data to which the private blockchain(s) is associated.

In some embodiments, the data lineage information stored in the newly created block of the new sidechain may be configured to store information indicating a change to the piece of data made by the access key target. The change to the piece of data made by the access key target comprises at least one of transforming: a content of the piece of data, changing an ownership of the piece of data, changing a property of the piece of data, changing a storage location of the piece of data, creating a copy of the piece of data, transmitting the piece of data or the copy of the piece of data to a different location from a source location of the piece of data or the copy of the piece of data, using the piece of data, and changing a retention policy of the piece of data. In some embodiments, the access key target is an entity associated with the public blockchain network (e.g., a third-party contractor/vendor, a regulatory entity, or the like) different from an entity associated with the private blockchain network (e.g., a corporation such as a financial institution).

As described above, example embodiments provide methods and apparatuses that provide interoperability between private and public blockchain that has traditionally not been available. Example embodiments thus provide tools that overcome the problems faced by conventional data lineage documentation technologies and processes utilized in the technical fields of analytics and data management and blockchain by allowing associated with a public blockchain to make access (e.g., retrieve, view, use, and/or update a data lineage of a piece of data) associated with one or more blocks (e.g., NFTs) minted on a private blockchain.

As these examples all illustrate, example embodiments contemplated herein provide technical solutions that solve real-world problems faced during management and documentation of data and during the interaction between private and public blockchains. In particular, conventionally, not only is data lineage not well-documented access by public blockchains to private blockchains is generally very tedious or not possible at all. Additionally, recent advancements in technology have also contributed to an increased interest and demand of protecting and ensuring the accuracy (e.g., through application of more rigorous documentation and authentication processes) of data (namely, data stored in a distributed immutable ledger such as a blockchain). At the same time, the recently arising ubiquity the above-discussed problem has unlocked new avenues to solving this problem that historically were not available, and example embodiments described herein thus represent a technical solution to these real-world problems.

FIG. 3 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, via communications hardware of a key exchange controller, access key generation instructions;
generating, by a key generation engine of the key exchange controller and based on the access key generation instructions, an access key comprising access credentials;
transmitting, by the communications hardware, the access key to an access key target of a public blockchain on a public blockchain network, wherein the access key target is associated with a third-party entity that is different from a first entity associated with a private blockchain network;
receiving, by the communications hardware and from the access key target, an access request comprising (i) the access credentials and information indicating a private blockchain on the private blockchain network, and (ii) a smart contract comprising instructions to create a new block on the private blockchain network, wherein the new block is associated with the private blockchain of the private blockchain network;
providing, by a permissions engine of the key exchange controller and in response to receiving the access request, the access key target with access to (i) the private blockchain of the private blockchain network, and (ii) a piece of data stored on a storage device; and
documenting, using the smart contract, a change to the piece of data stored on the storage device caused by the third-party entity, by:
determining, by the permissions engine, that the smart contract further comprises the access credentials;
in response, causing, by a tokenizing engine of the key exchange controller, the private blockchain network to create the new block; and
creating the new block on the private blockchain network, wherein the change comprises at least one of transforming a content of the piece of data, changing a storage location of the piece of data, creating a copy of the piece of data, transmitting the piece of data or the copy of the piece of data to a different location from a source location of the piece of data or the copy of the piece of data, wherein the new block is created as a new sidechain on the private blockchain network, wherein the new sidechain is linked to the private blockchain, wherein the private blockchain is associated with the piece of data, wherein the private blockchain comprises a plurality of blocks including the new block on the new sidechain linked to the private blockchain, and wherein the plurality of blocks of the private blockchain stores data lineage information specifying a data lineage of the piece of data, wherein the data lineage information stored in the new block indicates the change to the piece of data made by the access key target.

2. The method of claim 1, wherein the access key is generated as the smart contract or a key exchange protocol.

3. The method of claim 2, wherein:
the key exchange controller is a first blockchain node associated with a first sidechain on the public blockchain network,
the access key generation instructions are transmitted to the key exchange controller from a second blockchain node of the private blockchain; and
transmitting the access key to the access key target on the public blockchain network further comprises transmitting the access key to a second sidechain on the public blockchain network, wherein the second sidechain is associated with the access key target.

4. The method of claim 3, wherein at least one of the first sidechain of the public blockchain network or the second sidechain of the public blockchain network is a partial consensus/selective node.

5. The method of claim 1, wherein the access request comprises a plurality of smart contracts, and each of the plurality of smart contracts includes the access credentials.

6. The method of claim 1, wherein the change to the piece of data made by the access key target comprises at least one of changing an ownership of the piece of data, changing a property of the piece of data, using the piece of data, and changing a retention policy of the piece of data.

7. A key exchange controller, comprising:
communications hardware configured to receive access key generation instructions;
a key generation engine configured to generate, based on the access key generation instructions, an access key comprising access credentials,
wherein the communications hardware is further configured to:
transmit the access key to an access key target of a public blockchain on a public blockchain network, wherein the access key target is associated with a third-party entity that is different from a first entity associated with a private blockchain network, and
receive, from the access key target, an access request comprising (i) the access credentials and information indicating a private blockchain on the private blockchain network, and (ii) a smart contract comprising instructions to create a new block on the private blockchain network, wherein the new block is associated with the private blockchain of the private blockchain network;
a permissions engine configured to provide, in response to receiving the access request, the access key target with access to (i) the private blockchain of the private blockchain network, and (ii) a piece of data stored on a storage device; and
the smart contract configured to document a change to the piece of data stored on the storage device caused by the third-party entity, by:
determining, by the permissions engine, that the smart contract further comprises the access credentials;

in response, causing, by a tokenizing engine of the key exchange controller, the private blockchain network to create the new block; and creating the new block on the private blockchain network, wherein the change comprises at least one of transforming a content of the piece of data, changing a storage location of the piece of data, creating a copy of the piece of data, transmitting the piece of data or the copy of the piece of data to a different location from a source location of the piece of data or the copy of the piece of data, wherein the new block is created as a new sidechain on the private blockchain network, wherein the new sidechain is linked to the private blockchain, wherein the private blockchain is associated with the piece of data, wherein the private blockchain comprises a plurality of blocks including the new block on the new sidechain linked to the private blockchain, and wherein the plurality of blocks of the private blockchain stores data lineage information specifying a data lineage of the piece of data, wherein the data lineage information stored in the new block indicates the change to the piece of data made by the access key target.

8. The key exchange controller of claim 7, wherein the access key is generated as the smart contract or a key exchange protocol.

9. The key exchange controller of claim 8, wherein:
the key exchange controller is a first blockchain node associated with a first sidechain on the public blockchain network,
the access key generation instructions are transmitted to the key exchange controller from a second blockchain node of the private blockchain; and
the communications hardware is further configured to, as part of transmitting the access key to the access key target on the public blockchain network, transmit the access key to a second sidechain on the public blockchain network, wherein the second sidechain is associated with the access key target.

10. The key exchange controller of claim 9, wherein at least one of the first sidechain of the public blockchain network or the second sidechain of the public blockchain network is a partial consensus/selective node.

11. The key exchange controller of claim 7, wherein the access request comprises a plurality of smart contracts, and each of the plurality of smart contracts includes the access credentials.

12. The key exchange controller of claim 7, wherein the change to the piece of data made by the access key target comprises at least one of changing an ownership of the piece of data or changing a property of the piece of data.

13. The key exchange controller of claim 7, wherein the change to the piece of data made by the access key target comprises at least one of using the piece of data or changing a retention policy of the piece of data.

14. A computer program product comprising at least one non-transitory computer-readable storage medium storing software instructions that, when executed, cause a key exchange controller to:
receive access key generation instructions;
generate, based on the access key generation instructions, an access key comprising access credentials;
transmit the access key to an access key target of a public blockchain on a public blockchain network, wherein the access key target is associated with a third-party entity that is different from a first entity associated with a private blockchain network;
receive, from the access key target, an access request comprising (i) the access credentials and information indicating a private blockchain on the private blockchain network, and (ii) a smart contract comprising instructions to create a new block on the private blockchain network, wherein the new block is associated with the private blockchain of the private blockchain network;
provide, in response to receiving the access request, the access key target with access to (i) the private blockchain of the private blockchain network, and (ii) a piece of data stored on a storage device; and
document, using the smart contract, a change to the piece of data stored on the storage device caused by the third-party entity, by:
determining, by a permissions engine, that the smart contract further comprises the access credentials;
in response, causing, by a tokenizing engine of the key exchange controller, the private blockchain network to create the new block; and
creating the new block on the private blockchain network, wherein the change comprises at least one of transforming a content of the piece of data, changing a storage location of the piece of data, creating a copy of the piece of data, transmitting the piece of data or the copy of the piece of data to a different location from a source location of the piece of data or the copy of the piece of data, wherein the new block is created as a new sidechain on the private blockchain network, wherein the new sidechain is linked to the private blockchain, wherein the private blockchain is associated with the piece of data, wherein the private blockchain comprises a plurality of blocks including the new block on the new sidechain linked to the private blockchain, and wherein the plurality of blocks of the private blockchain stores data lineage information specifying a data lineage of the piece of data, wherein the data lineage information stored in the new block indicates the change to the piece of data made by the access key target.

15. The computer program product of claim 14, wherein the access key is generated as the smart contract or a key exchange protocol.

16. The computer program product of claim 15, wherein:
the key exchange controller is a first blockchain node associated with a first sidechain on the public blockchain network,
the access key generation instructions are transmitted to the key exchange controller from a second blockchain node of the private blockchain; and
transmitting the access key to the access key target on the public blockchain network further comprises transmitting the access key to a second sidechain on the public blockchain network, wherein the second sidechain is associated with the access key target.

17. The computer program product of claim 16, wherein at least one of the first sidechain of the public blockchain network or the second sidechain of the public blockchain network is a partial consensus/selective node.

18. The computer program product of claim 14, wherein the access request comprises a plurality of smart contracts, and each of the plurality of smart contracts includes the access credentials.

19. The computer program product of claim 14, wherein the change to the piece of data made by the access key target comprises at least one of changing an ownership of the piece of data or changing a property of the piece of data.

20. The computer program product of claim 14, wherein the change to the piece of data made by the access key target comprises at least one of using the piece of data or changing a retention policy of the piece of data.

* * * * *